US006810154B2

United States Patent
Konoshima

(10) Patent No.: US 6,810,154 B2
(45) Date of Patent: Oct. 26, 2004

(54) METHOD AND APPARATUS FOR AUTOMATIC SPATIAL RESOLUTION SETTING FOR MOVING IMAGES

(75) Inventor: Makiko Konoshima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 531 days.

(21) Appl. No.: 09/812,825

(22) Filed: Mar. 21, 2001

(65) Prior Publication Data

US 2002/0061143 A1 May 23, 2002

(30) Foreign Application Priority Data

Nov. 21, 2000 (JP) ........................................ 2000-354895

(51) Int. Cl.⁷ ............................ G06K 9/36; G06K 9/40; H04N 7/12
(52) U.S. Cl. ........................ 382/299; 382/233; 382/268
(58) Field of Search ................................ 382/100, 173, 382/232, 233, 248, 251, 268, 269, 270, 275, 276, 299, 250, 254, 266, 298; 348/27; 375/240.12, 240.24, 240.27, 240.29

(56) References Cited

U.S. PATENT DOCUMENTS

| 4,363,123 A | * | 12/1982 | Grover ......................... 377/28 |
| 4,994,911 A | * | 2/1991 | Nakayama et al. .... 375/240.24 |
| 5,590,222 A | * | 12/1996 | Kojima ........................ 382/268 |
| 5,654,759 A | | 8/1997 | Augenbraun et al. |
| 5,819,035 A | * | 10/1998 | Devaney et al. ............. 709/202 |
| 5,828,784 A | * | 10/1998 | Miyashita et al. ........... 382/232 |
| 5,877,813 A | * | 3/1999 | Lee et al. ............... 375/240.12 |
| 5,982,442 A | | 11/1999 | Guntzburger |
| 6,122,411 A | * | 9/2000 | Shen et al. .................. 382/299 |
| 6,611,608 B1 | * | 8/2003 | Wu et al. .................... 382/100 |

FOREIGN PATENT DOCUMENTS

| EP | 0 884 911 A1 | 12/1998 |
| JP | 5-316364 | 11/1993 |
| JP | 10-191351 | 7/1998 |
| JP | 10-304381 | 11/1998 |

OTHER PUBLICATIONS

Fukunaga, S. et al., "MPET–4 Video Verification Model Version 16.0", International Organization for Standardization–Organisation Internationale de Normalisation, vol N3312, Mar. 2000, pp. 1–380.

(List continued on next page.)

Primary Examiner—Kanji Patel
(74) Attorney, Agent, or Firm—Staas & Halsey LLP

(57) ABSTRACT

There is provided a method for automatically set a spatial resolution for an image to be encoded by properties of an image during an encoding process. The method includes the steps of dividing the moving image into blocks and compression encoding the moving image for each of the blocks, decoding an encoded moving image, obtaining a block distortion ratio from a decoded image, and making a resolution decision to select a first resolution lower than a current spatial resolution if the block distortion ratio is greater than a first threshold value or a second resolution higher than the current spatial resolution if the block distortion ratio is smaller than a second threshold value.

8 Claims, 6 Drawing Sheets

OTHER PUBLICATIONS

"Video Codec Test Model, Near–Term, Version 10 (TMN10) Draft 1", ITU–T Telecommunication Standardization Sector of ITU, Geneva, Apr. 21, 1998, pp. 1–33.

Jeon, B. et al., "Blocking Artifacts Reduction in Image Compression with Block Boundary Discontinuity Criterion", IEEE Transactions on Circuits and Systems for Video Technology, New York, vol. 8, No. 3, Jun. 1, 1998.

Jeon, B. et al., "Blocking Artifacts Reduction in Image Coding Based on Minimum Block Boundary Discontinuity", Proceedings of the SPIE, SPIE, Bellingham, VA, vol. 2501, No. PART 1, May 24, 1995.

Derviaux, C. et al., "A Postprocessing Technique for Block Effect Elimination Using a Perceptual Distortion Measure", Acoustics, Speech, and Signal Processing 1997, 1997 IEEE International Conference on Munich, Germany, Apr. 21–24, 1997, Los Alamitos, CA, pp. 3001–3004.

Coudoux, F–X et al., "Reduction of Blocking Effect in DCT–Coded Images Based on a Visual Perception Criterion", Signal Process, Image Communication Elsevier Science Publishers, Ameterdam, NL. vol. 11, No 3, 1998, pp. 179–186.

* cited by examiner

METHOD AND APPARATUS FOR AUTOMATIC SPATIAL RESOLUTION SETTING FOR MOVING IMAGES

BACKGROUND OF THE INVENTION

1. Field of the Invention

The present invention generally relates to high efficiency compression encoding and decoding methods for video data of moving images, and particularly to a methods and an apparatus for automatic switching of spatial resolution of video signals to be encoded in accordance with properties of images during encoding of the moving images.

2. Description of the Related Art

Image compression is performed to transmit a maximum quality of images within a limited bandwidth in moving image transmissions. The image compression for a given spatial resolution, such compression methods as MPEG-4 and H.263 are employed, for example. In such compression methods for the moving images, there are requirements to switch the spatial resolution in encoding in accordance with complexity of the images in a same scene and in a same bit stream.

FIG. 1 shows a conventional switching apparatus for switching the spatial resolution. In FIG. 1, a switching apparatus 100 includes an encoding unit 101, a single frame averaged quantization size calculation unit 102, an originated data bit counter unit 103, a resolution decision unit 104 and a memory unit 105. A moving image signal 110 with a certain resolution is input to the encoding unit 101. At first, a switching of the resolution takes place in accordance with a resolution 111 that is determined by the resolution decision unit 104. Then, the encoding unit 101 encodes the moving images into a bit stream 112 by a given compression method, and also the encoding unit 101 outputs a quantization size 113 for each of blocks, which is input to the single frame averaged quantization size calculation unit 102. The resolution decision unit 104 determines a resolution 111 by threshold values QP1, QP2, FR1 and FR2 as will be described later, based on an originated data bit quantity 114 (the number of information bits) from the originated bit counter unit 103, a quantization size 115 output by the single frame averaged quantization size calculation unit 102, and a previous resolution 116 output by the memory 105.

An example of conventional technology for the resolution decision unit 104 may be referred to ITU-T Document Q15-C-15 "Video Codec Test Model, Near-Term, Version 9" issued in December 1997. FIG. 2 shows a process flow of the resolution decision method disclosed in this document. This method is based on a principle that a product of an average quantization size (QPpre in FIG. 2) expresses a complexity, i.e., a degree of difficulty in encoding, and an originated data size (B in FIG. 2).

FIG. 2 represents operations for one frame. In a step 201, necessary parameters are provided. Th1 and Th2 represent threshold values. QPpre represents a single frame averaged quantization size of a frame encoded most recently. B represents an originated data volume of the frame that was encoded most recently. QP1, QP2, FR1 and FR2 are parameters to determine the threshold values. TB represents a targeted bit rate. Here, the threshold value Th1 is a threshold value with respect to image complexity in a high spatial resolution. If a product of the single frame averaged quantization size QPpre for the most recent encoded frame, as described in above, and the originated data volume B of the most recent encoded frame is larger than the threshold value Th1, then it is determined that the image is exceedingly complex, and the resolution for the image to be encoded is chosen to be low. Conversely, the threshold value Th2 is a threshold value with respect to the image complexity in a low spatial resolution. If the product of the single frame averaged quantization size QPpre for the most recent encoded frame, as described in above, and the originated data volume B is smaller than the threshold value Th2, then it is determined that the image is not complex, and the resolution for the image to be encoded is chosen to be high. FR1 is a frame rate corresponding to the high resolution, and FR2 is a frame rate corresponding to the low resolution. FR1 and FR2 may be equal.

In a step 202, the threshold values Th1 and Th2 are determined. The threshold value Th1 is calculated by multiplying the parameter QP1 to the target bit rate per frame TB/FR1 for the high resolution. Similarly, the threshold value Th2 is calculated by multiplying the parameter QP2 to the target bit rate per frame TB/FR2 for the low resolution.

In a step 203, a present spatial resolution, whether high or low, is checked. If the present spatial resolution is high, then the process proceeds to a step 204, otherwise it proceeds to a step 205.

In a step 204, a decision is made whether or not the resolution for the next frame should be lowered, given that the present spatial resolution is high. Actually, the threshold value Th1 is compared with the product of the single frame averaged quantization size QPpre for the most recently encoded frame and the originated data volume B for the most recently encoded frame, and if the product of QPpre and B is larger than Th1, then the spatial resolution for the next frame is lowered in a step 206.

In a step 205, a decision is made whether or not the resolution for the next frame should be heightened, given that the present spatial resolution is low. Actually, the threshold value Th2 is compared with the product of the single frame averaged quantization size QPpre for the most recently encoded frame and the originated data volume B for the most recently encoded frame, and if the product of QPpre and B is lower than Th2, then the spatial resolution for the next frame is heightened in a step 207.

In conventional technologies as described above, there is a problem. If a video content is of relatively still with modest movement, that is, if there is no discontinuity, such as scene changes, or abrupt movements in the contents, the product of the single frame averaged quantization size QPpre of the most recent encoded frame and the originated data volume B for the most recently encoded frame may be used as a standard to express the complexity of images. However, where the contents include images with such discontinuity as scene changes and abrupt movements, the product cannot be used as the standard for the image complexity. However, the product has been used as the standard to express the image complexity in conventional technologies.

For this reason, as described above, parameters have had to be manually adjusted in encoding when a video program contains images with abrupt motions, while the motions may not be highly visible to an audience, which has made a realtime encoding impossible and required a certain expertise to set the parameters.

SUMMARY OF THE INVENTION

It is a general object of the present invention to provide a method and an apparatus that substantially obviates one or more of the problems caused by the limitations and disadvantages of the related art.

Another object of the present invention to provide a method and an apparatus that automatically switches the spatial resolution of an image to be encoded by properties of the image, even during the encoding process.

The above objects of the present invention are achieved by an automatic setting method of a spatial resolution for a moving image, comprising the steps of: dividing the moving image into blocks and compression encoding the moving image for each of the blocks; decoding an encoded moving image thus obtained; obtaining a block distortion ratio from a decoded image; and making a resolution decision to select a first resolution lower than a current spatial resolution if the block distortion ratio is greater than a first threshold value or a second resolution higher than the current spatial resolution if the block distortion ratio is smaller than a second threshold value. In this manner, block distortions generated by a larger quantization size that has been introduced to compress the data volume to the required bit rate are suppressed.

The above-mentioned objects of the present invention are also achieved by an apparatus for automatically setting a spatial resolution for a moving image, comprising: a first unit dividing the moving image into blocks and compression encoding the moving image for each of the blocks; a second unit decoding an encoded moving image thus obtained; a third unit obtaining a block distortion ratio from a decoded image; and a fourth unit making a resolution decision to select a first resolution lower than a current spatial resolution if the block distortion ratio is greater than a first threshold value or a second resolution higher than the current spatial resolution if the block distortion ratio is smaller than a second threshold value.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

In the following, embodiments of the present invention will be described with reference to the accompanying drawings.

Figure 1:
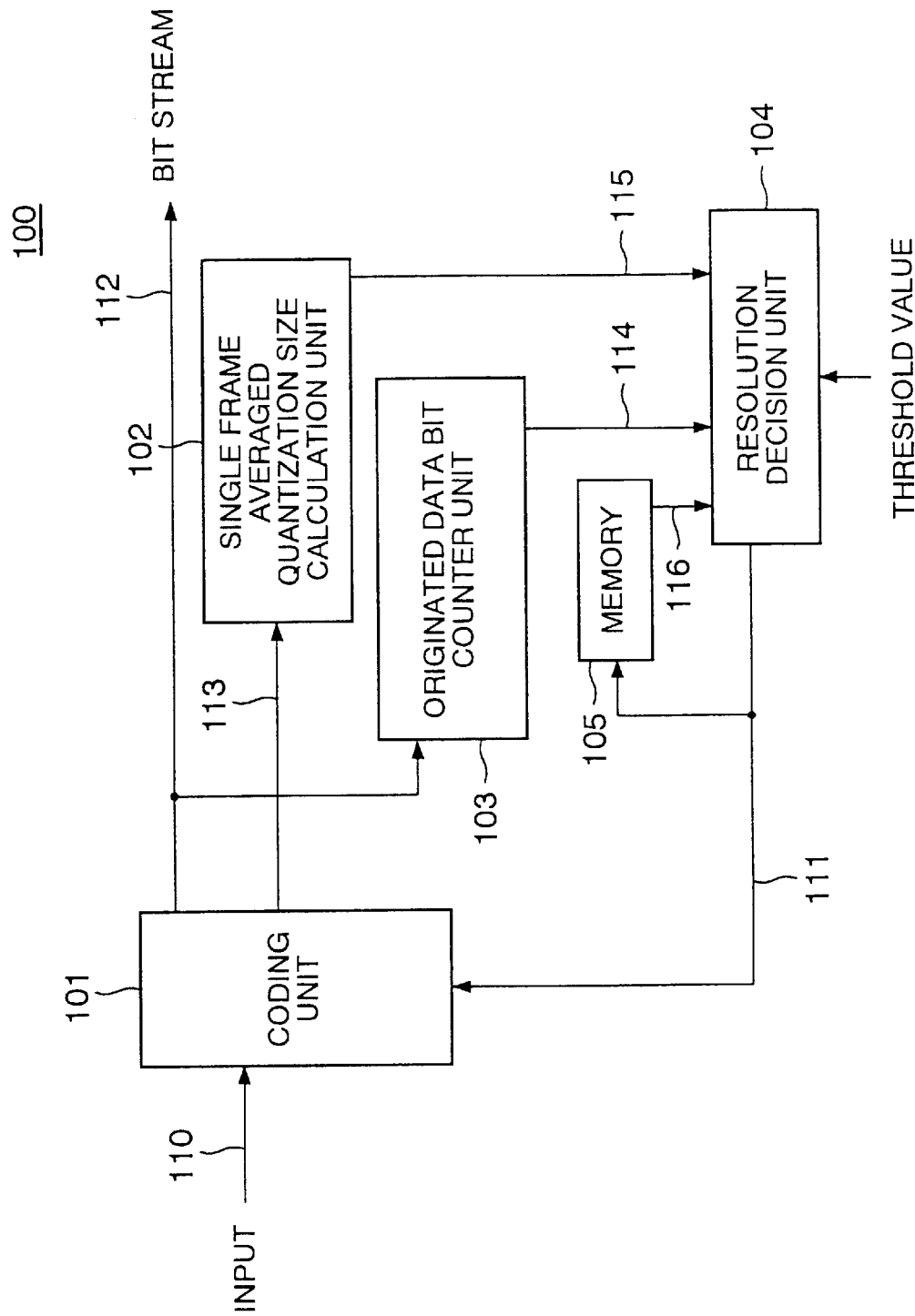
FIG. 1 shows a conventional spatial resolution switching apparatus.
Figure 2:
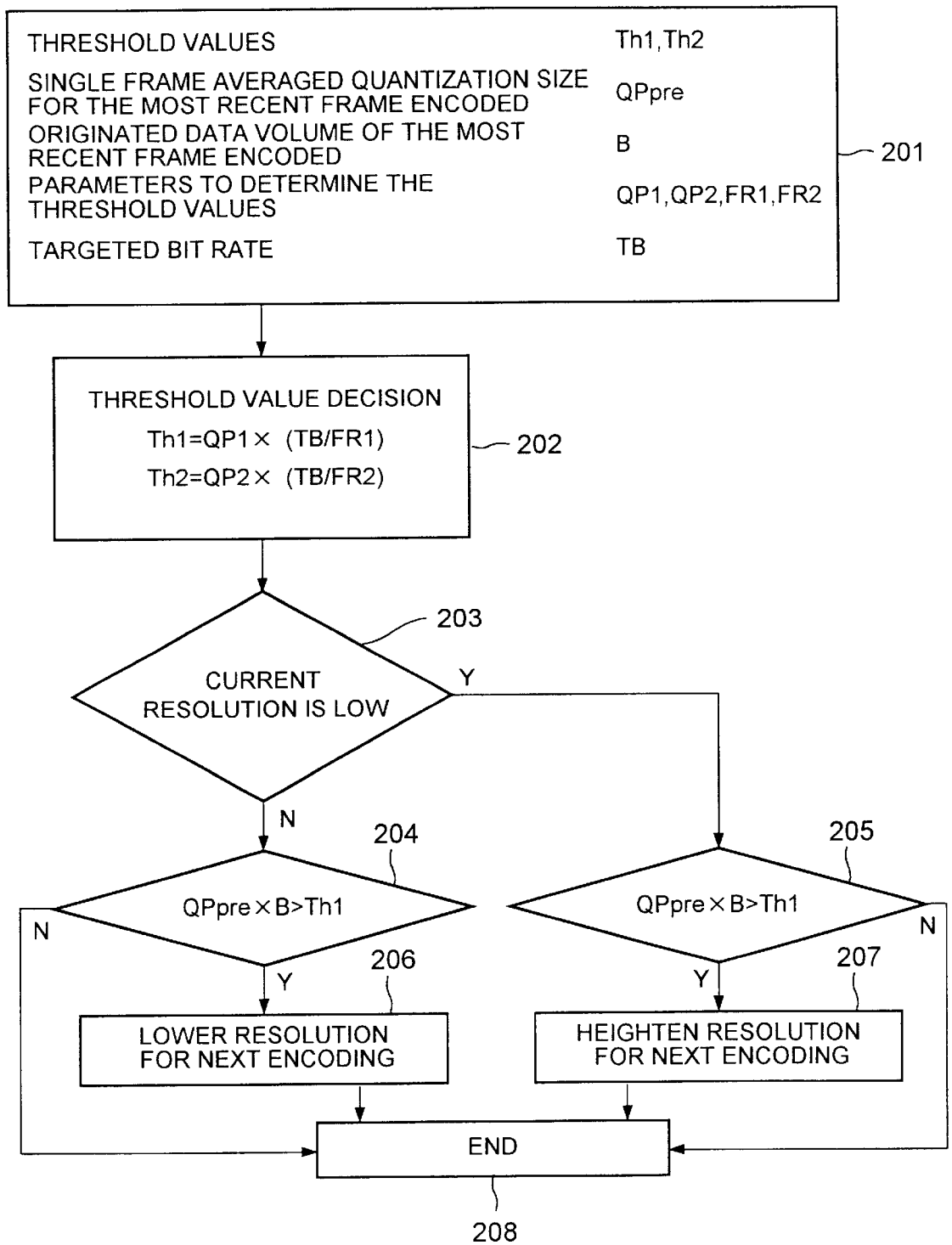
FIG. 2 is a flow chart showing a decision process for a resolution for a spatial resolution switching apparatus under conventional technologies.
Figure 3:
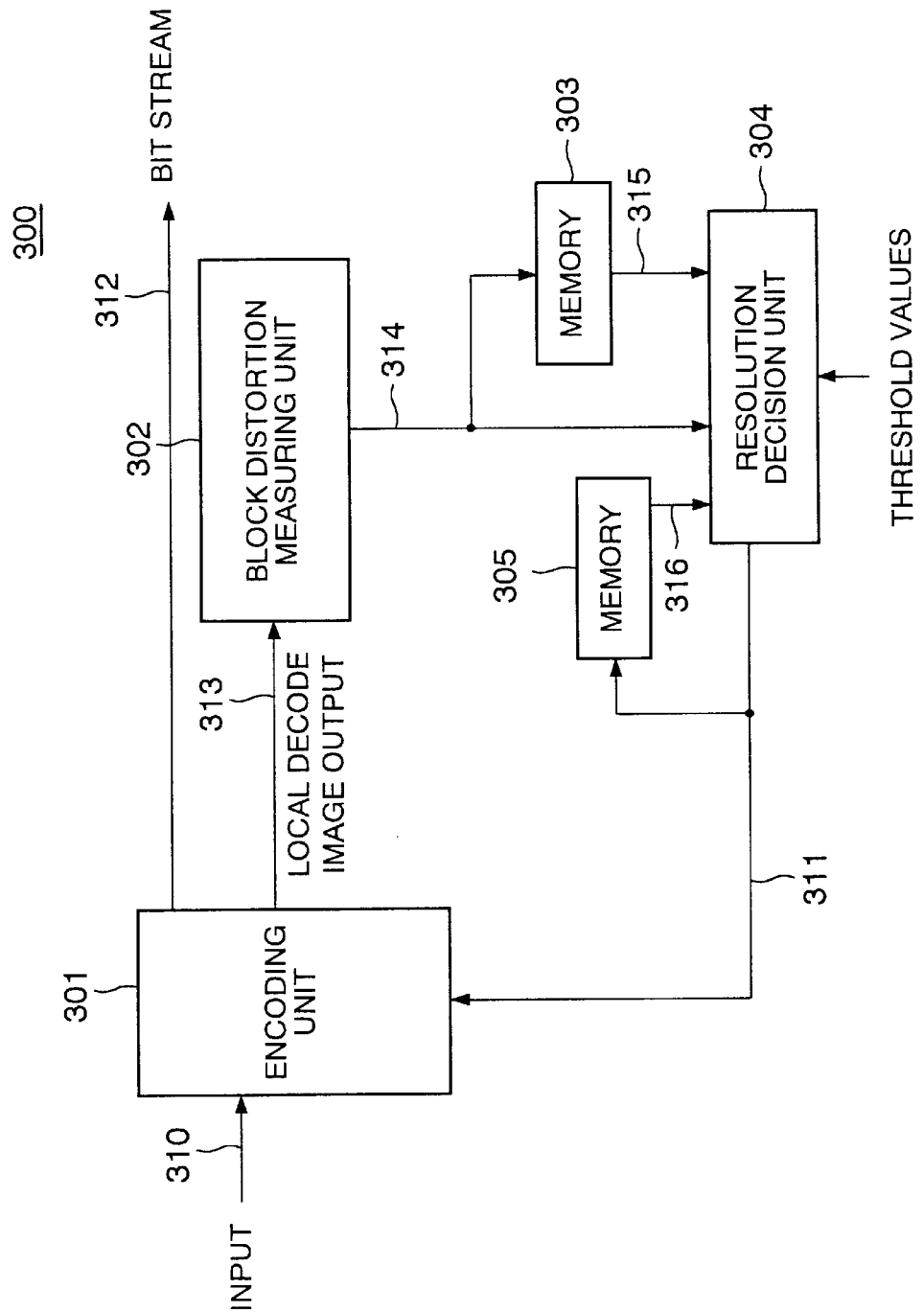
FIG. 3 is a block diagram of a spatial resolution switching apparatus of the present invention.

FIG. 3 shows an embodiment of the present invention. More particularly, FIG. 3 is a block diagram of a spatial resolution switching apparatus 300. The spatial resolution switching apparatus 300 includes an encoding unit 301, a block distortion measuring unit 302, memory units 303 and 305 and a resolution decision unit 304.

The encoding unit 301 receives input moving images 310 that have a certain resolution. At first, the resolution is determined by a resolution 311 that is decided by the resolution decision unit 304. Then, the encoding unit 301 compresses the moving images as a bit stream 312 by a chosen compression method. If a differential encoding is employed as the encoding method, a local decode output image 313 is output from the encoding unit 301 to the block distortion measuring unit 302, concurrently. Here, the local decode output image is one that is decoded in the encoding unit and that is used as a standard when a difference from the input image is calculated. The resolution of the local decode output image is set at same as that of the input image. If a differential encoding is not employed as the encoding method, the encoding unit 301 outputs an image 313 that is decoded from the compressed image, concurrently. The resolution decision unit 304 decides the resolution 311 according to operation flow as will be described with reference to FIGS. 4 through 6, based on a past block distortion ratio 315 supplied from the memory 303, which is based on the block distortion ratio 314 from the block distortion measuring unit 302 and a resolution 316 provided by the memory 305.

A calculation method for the block distortion ratio is described with reference to FIGS. 4 through 6. The block distortion ratio is defined as a ratio of an accumulated sum of pixel value differences at block boundaries both vertically and horizontally to an accumulated sum of pixel value differences within a block.

Figure 4:
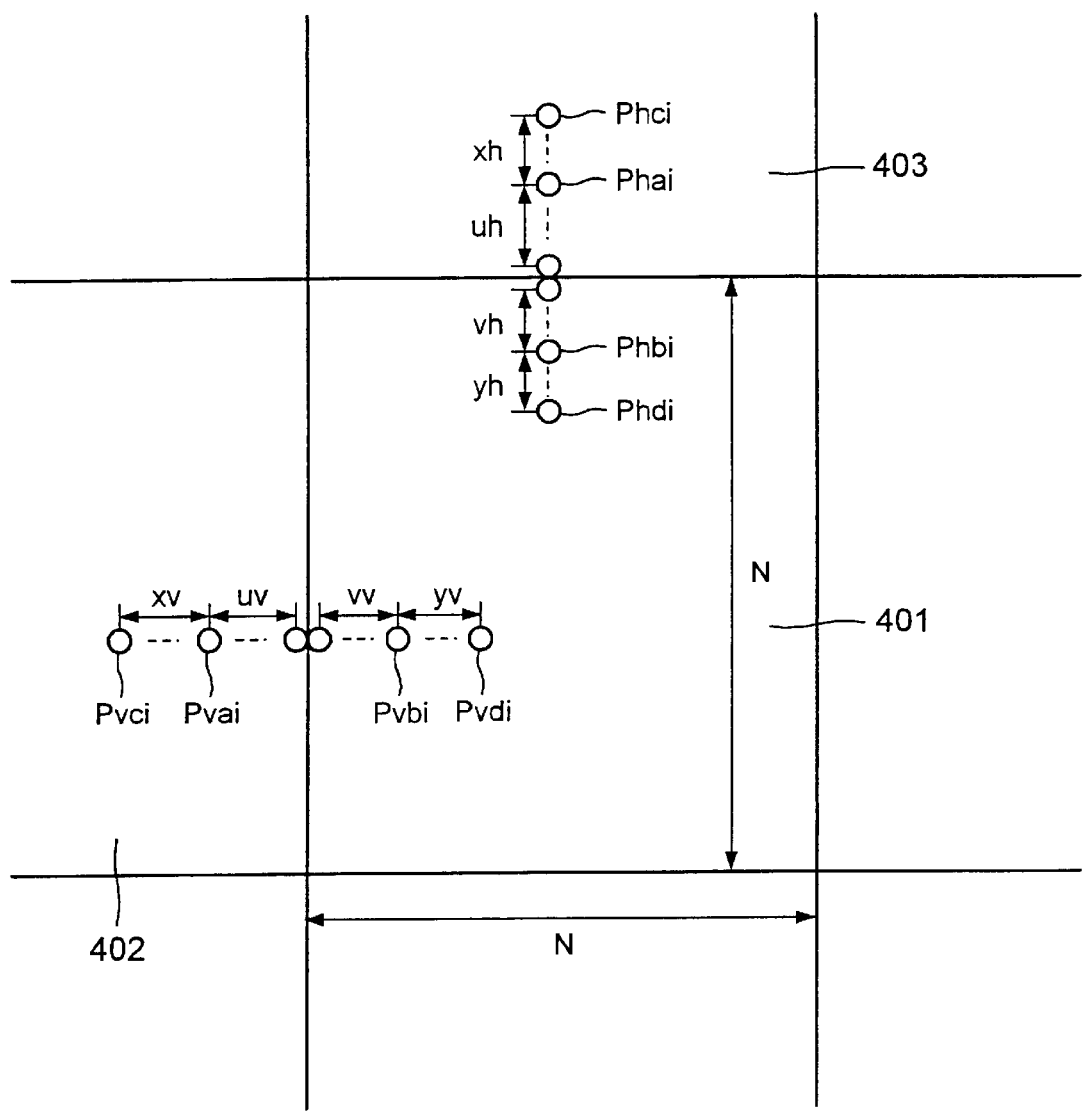
FIG. 4 shows adjacent image blocks and pixels that are used to calculate a block distortion ratio.

FIG. 4 shows adjacent image blocks and pixels used in the calculation of the block distortion ratio. A pixel that is uv pixels apart from a first pixel on the left of a block border is called Pvai. A pixel that is vv pixels apart from a first pixel on the right of the block border is called Pvbi. A pixel that is xv pixels apart toward the left from the pixel Pvai is called Pvci. A pixel that is yv pixels apart toward the right from the pixel Pvbi is called Pvdi. Further, a pixel that is uh pixels apart from a first pixel above the block border is called Phai. A pixel that is vh pixels apart from a first pixel below the block border is called Phbi. A pixel that is xh apart upward from the pixel Phai is called Phci. A pixel that is yh pixels apart downward from the pixel Phbi is called Phdi. Distances uv, vv, xv, yv, uh, vh, xh and yh are selected in accordance with a current resolution. Where the present resolution is low, adjacent cells may represent results from a low pass filter processing, implying a high correlation among adjacent pixels, thereby an unsatisfactory value may be obtained. In case the resolution is the highest, uv=vv=0 and xv=yv=1 are acceptable. Similarly, uh=vh=0 and xh=yh=1 are acceptable in that case.

Figure 5:
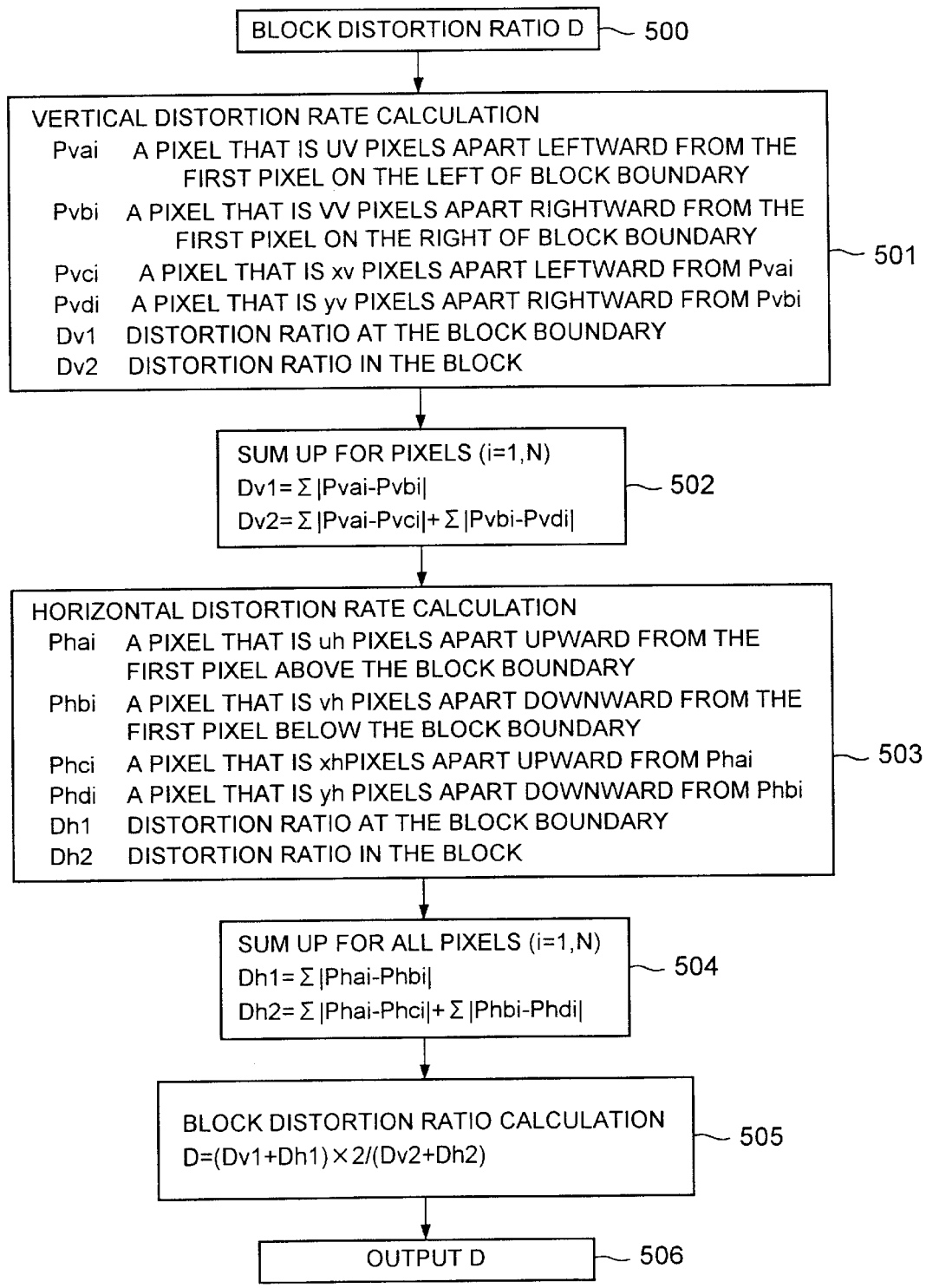
FIG. 5 shows a calculation process for the block distortion ratio.
Figure 6:
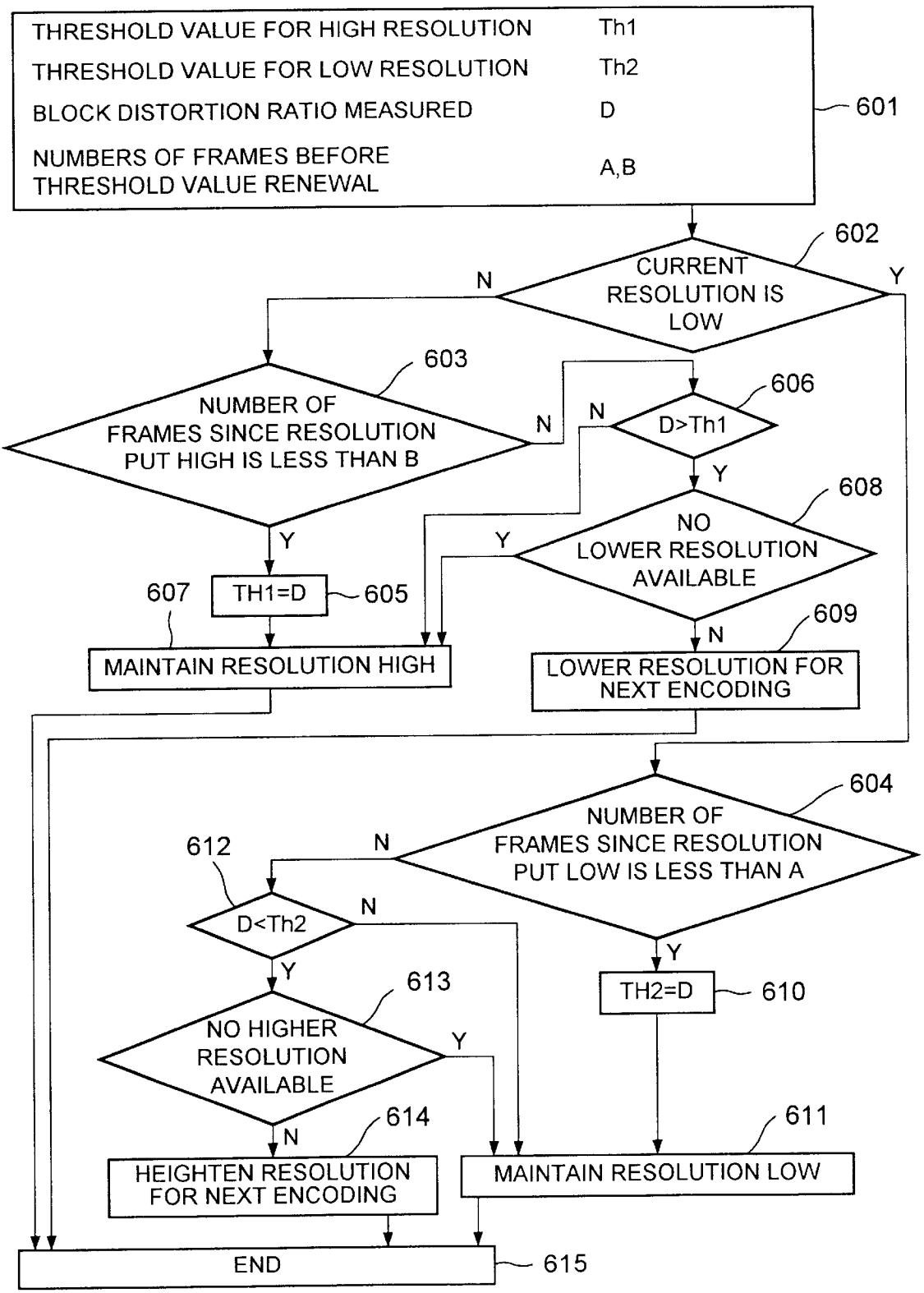
FIG. 6 is a flow chart for the embodiment of the present invention.

FIG. 5 describes a calculation method of the block distortion ratio. First, a calculation method for the vertical direction is described. In a step 501, pixels are chosen as described above for the calculation. Here, a distortion ratio at the block boundary is called Dv1 and a distortion ratio in the block is called Dv2.

In a step 502, the block boundary distortion ratio Dv1 and the in-block distortion ratio Dv2 are calculated. The block boundary distortion ratio Dv1 is a sum of absolute values of differences between Pvai and Pvbi for all pixels (i=1, N) which occupy both blocks of the boundary in FIG. 4. To calculate the in-block distortion ratio, a sum of absolute values of differences between Pvai and Pvci and a sum of absolute values of differences between Pvbi and Pdi are totaled for all pixels (i=1, N) in the block in FIG. 4. Instead of the sums of absolute values, sums of the values raised to a higher power, e.g., square of difference values, may be calculated.

The block distortion ratio in the horizontal direction is described. In a step 503, pixels are chosen for calculation as described above. Here, a block boundary distortion ratio is called Dh1 and an in-block distortion ratio is called Dh2.

In a step 504, the block boundary distortion ratio Dh1 and the in-block distortion ratio Dh2 are calculated. The block boundary distortion ratio Dh1 is a sum of absolute values of differences between Phai and Phbi for all pixels (i=1, N) that occupy both blocks in FIG. 4. Further, the in-block distortion ratio Dh2 is a sum of absolute values of differences between Phai and Phci and a sum of absolute values of differences between Phbi and Phdi for all pixels in the block of FIG. 4 (i=1, N) are totaled. Instead of the sums of absolute values, sums of the values raised to a higher power, e.g., square of difference values, may be calculated.

In a step 505, a block distortion ratio D is calculated by the following formula. $D=(Dv1+Dh1) \times 2/(Dv2+Dh2)$. The block distortion ratio D is output in a step 506, to finish the process.

An operation detail of the resolution decision unit 304 based on the block distortion ratio as above calculated is described with reference to FIG. 6 that is a flow chart of the embodiment example of the present invention. In the embodiment in FIG. 6, there are two resolutions, high and low. There may be three or more resolutions that can be decided in a similar manner to the embodiment.

In a step 601, a threshold value for a high spatial resolution is called Th1 and another for a low spatial resolution is called Th2. The block distortion ratio D as calculated above is used. Further, frame numbers A and B are introduced, which are the numbers of the frames that will be examined before renewal of the threshold values.

In a step 602, a present resolution is checked, whether high or low. If the resolution is high, then the process proceeds to a step 603, otherwise to a step 604.

In the step 603, if a number of frames that have been processed since the resolution was determined high is smaller than B, then the process proceeds to a step 605 where the threshold value Th1 is substituted by D, and then the spatial resolution is kept at high in a step 607. The process then proceeds to a step 615 to end itself.

On the other hand, if the number of the frames that have been processed since the resolution was determined high is larger than B, then the process proceeds to a step 606 to determine whether or not the resolution is to be changed. In the step 606, if the lock distortion ratio D exceeds the threshold value Th1, then the process proceeds to a step 608 where a test is performed to determine whether the resolution is a lowest resolution. In the step 608, if the resolution is determined not to be the lowest resolution, then the process proceeds to a step 609 where the resolution is changed to a next lower resolution for the next frame to use the renewed resolution in encoding. On the other hand, if the block distortion ratio D is not greater than the threshold value Th1, then the process proceeds to the step 607 to maintain the resolution as described above.

In a step 604, if a number of frames that have been processed since the resolution was determined low is less than A, then the process proceeds to a step 610 where the threshold value Th2 is substituted with D and the spatial resolution is not changed in a step 611. Then, the process proceeds to the step 615 to end the process.

On the other hand, if the number of frames that have been processed since the resolution was determined low is greater than A, then the process proceeds to a step 612 where a decision is made as to whether or not the resolution shall be changed. In the step 612, in case that the block distortion ratio D is smaller than the threshold value Th2, the process proceeds to a step 613 for a checking whether the resolution is a highest resolution. In the step 613, if the resolution is determined not to be the highest resolution, then the process proceeds to a step 614 where the resolution is heightened to a next higher resolution for encoding a next frame to use the renewed resolution. On the other hand, if the block distortion ratio D is not smaller than the threshold value Th2 in the step 613, then the process proceeds to the step 611 where no resolution change takes place as described above.

Through the process described above, the spatial resolution for a frame to be encoded next is determined. In the above embodiment, D was substituted to the threshold values Th1 and Th2. However, one or both may be fixed.

As described above, the present invention provides a method and an apparatus that automatically align the spatial resolution for moving pictures while suppressing such undesired matters as the block distortion by lowering the spatial resolution and maintaining the quantization size constant when a large amount of data is necessary for encoding pictures with abrupt motions.

Further, the present invention is not limited to these embodiments, but various variations and modifications may be made without departing from the scope of the present invention.

The present application is based on Japanese priority application No. 2000-354895 filed on Nov. 21, 2000 with the Japanese Patent Office, the entire contents of which are hereby incorporated by reference.

What is claimed is:

1. An automatic setting method of a spatial resolution for a moving image, comprising:
   dividing the moving image into blocks and encoding, by compression, the moving image for each of the blocks;
   decoding an encoded moving image thus obtained;
   obtaining a block distortion ratio from a decoded image; and
   making a resolution decision to select a first resolution lower than a current spatial resolution if the block distortion ratio is greater than a first threshold value or a second resolution higher than the current spatial resolution if the block distortion ratio is smaller than a second threshold value, wherein the obtaining the block distortion ratio comprises calculating a ratio of a sum of absolute values for differences between pixels along block boundaries to a sum of absolute values of differences between pixels in each block.

2. The automatic setting method as claimed in claim 1, wherein the first and second threshold values are determined based on the block distortion ratio.

3. An automatic setting method of a spatial resolution for a moving image, comprising:
   dividing the moving image into blocks and encoding, by compression, the moving image for each of the blocks;
   decoding an encoded moving image thus obtained;
   obtaining a block distortion ratio from a decoded image; and
   making a resolution decision to select a first resolution lower than a current spatial resolution if the block distortion ratio is greater than a first threshold value or a second resolution higher than the current spatial resolution if the block distortion ratio is smaller than a second threshold value, wherein the calculating the block distortion ratio comprises calculating a ratio of a sum of square values of differences between pixels along the block boundaries to a sum of square values of differences between pixels in each block.

4. The automatic setting method as claimed in claim 3, wherein the first and second threshold values are determined based on the block distortion ratio.

5. An apparatus for automatically setting a spatial resolution for a moving image, comprising:

a first unit dividing the moving image into blocks and encoding, by compression, the moving image for each of the blocks;

a second unit decoding an encoded moving image thus obtained;

a third unit obtaining a block distortion ratio from a decoded image; and a fourth unit making a resolution decision to select a first resolution lower than a current spatial resolution if the block distortion ratio is greater than a first threshold value or a second resolution higher than the current spatial resolution if the block distortion ratio is smaller than a second threshold value, wherein the third unit calculates a ratio of a sum of absolute values for differences between pixels along block boundaries to a sum of absolute values of differences between pixels in each block.

6. The apparatus as claimed in claim 5, wherein the first and second threshold values are determined based on the block distortion ratio.

7. An apparatus for automatically setting a spatial resolution for a moving image, comprising:

a first unit dividing the moving image into blocks and encoding, by compression, the moving image for each of the blocks;

a second unit decoding an encoded moving image thus obtained;

a third unit obtaining a block distortion ratio from a decoded image; and a fourth unit making a resolution decision to select a first resolution lower than a current spatial resolution if the block distortion ratio is greater than a first threshold value or a second resolution higher than the current spatial resolution if the block distortion ratio is smaller than a second threshold value, wherein the third unit calculates a ratio of a sum of square values of differences between pixels along the block boundaries to a sum of square values of differences between pixels in each block.

8. The apparatus as claimed in claim 7, wherein the first and second threshold values are determined based on the block distortion ratio.

* * * * *

UNITED STATES PATENT AND TRADEMARK OFFICE
CERTIFICATE OF CORRECTION

PATENT NO. : 6,810,154 B2
DATED : October 26, 2004
INVENTOR(S) : Makiko Konoshima It is certified that error appears in the above-identified patent and that said Letters Patent is hereby corrected as shown below:

Title page,
Item [56], References Cited, OTHER PUBLICATIONS, "Coudoux., F-X et al.," reference, "Ameterdam" should be -- Amsterdam --.

Signed and Sealed this

Fifth Day of April, 2005

JON W. DUDAS
*Director of the United States Patent and Trademark Office*